March 5, 1968     E. J. APPL     3,371,723
BLADE FASTENING ARRANGEMENT FOR IMPLEMENTS
Filed June 14, 1965
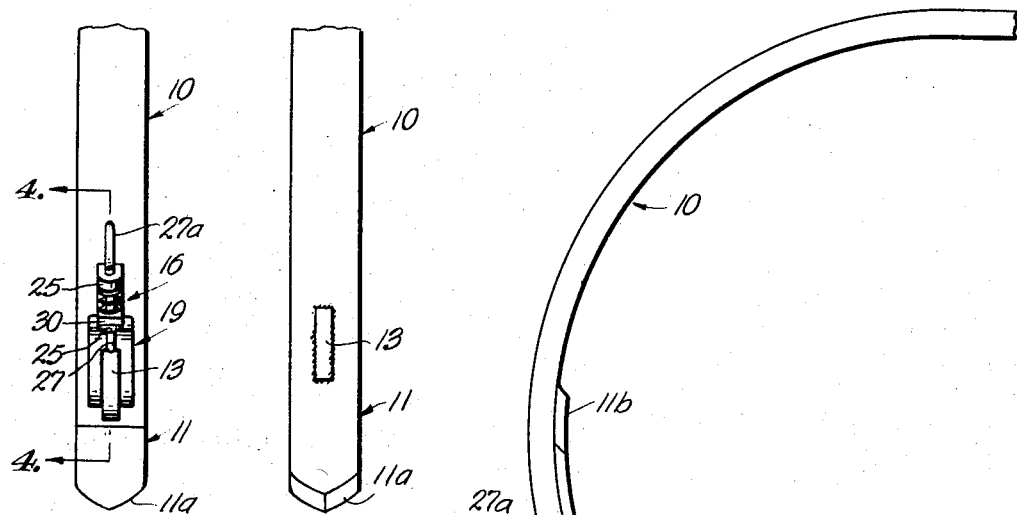
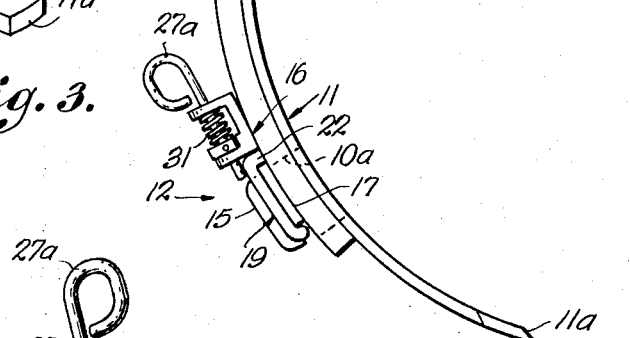
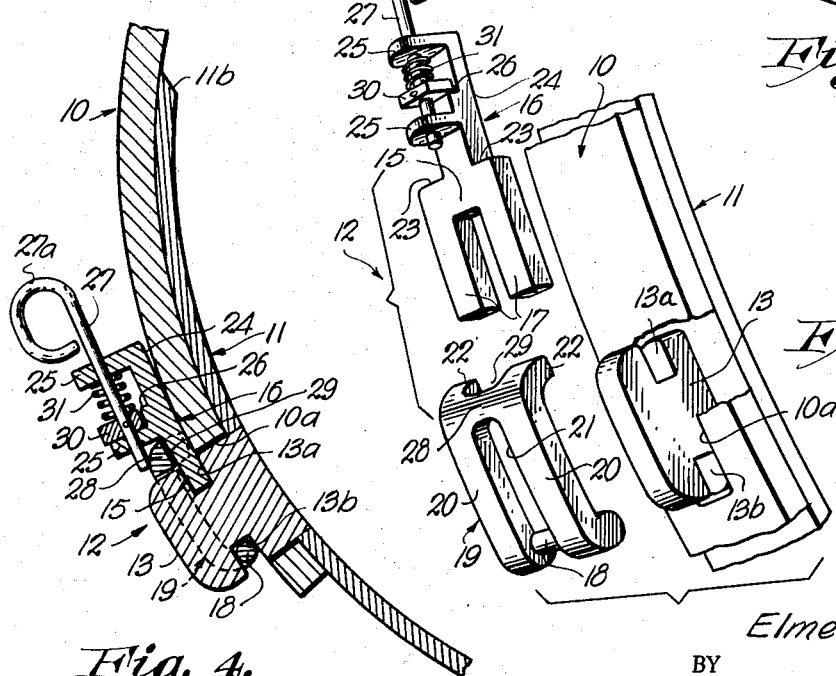
INVENTOR.
Elmer J. Appl
BY
Scofield, Kokjer, Scofield & Lowe
ATTORNEYS.

United States Patent Office 3,371,723
Patented Mar. 5, 1968

3,371,723
BLADE FASTENING ARRANGEMENT FOR IMPLEMENTS
Elmer J. Appl, Leoti, Kans. 67861
Filed June 14, 1965, Ser. No. 463,767
8 Claims. (Cl. 172—753)

ABSTRACT OF THE DISCLOSURE

A fastener assembly for releasably locking ground working blades to shanks of farm implements such as chisel plows. Each assembly includes a notched tongue member secured to the blade and projecting rearwardly through an aperture in the shank. A bifurcated keeper member and a locking member engage the notched portions of the rearwardly extending tongue and cooperate with a spring biased sliding bolt to lock said blade to said shank in a fixed but easily releasable manner.

---

This invention relates to farm implements and deals more particularly with implements of the type having a plurality of ground working blades or shoes which are removably secured to support shanks carried by the implement frame. The invention has particular utility in conjunction with so-called chisel plows.

Over the life of a chisel plow it frequently is necessary to remove and sharpen, reverse or replace the blade elements thereof. In the usual implement of this type the blades are secured to the shanks by common bolts and nuts. The implement carries a substantial number of blades. Thus the removal of the blades and their replacement is a time consuming task made even more difficult when the threads of the fastening bolts and nuts are not in good working order. Yet corrosion of the bolts and nuts does occur and occasionally there is jamming of the threads occasioned by excessive stresses applied to the tool.

A principal object of the present invention is to provide a quick release fastener arrangement for connecting an implement blade with its shank, which fastener arrangement is sufficiently strong to withstand the forces applied during use, yet enables rapid and facile assembly and disassembly of the blades with respect to the shank. It is a feature of the invention that the fastener arrangement embodying the same can be made of relatively heavy strong materials and that there are no threads or other close tolerance components likely to become jammed by deformation or corrosion during use.

A further object of the invention is to provide a fastener assembly which is so constructed that it is not possible for the components thereof to work loose or apart during use of the implement.

Another object of the invention is to provide a fastener assembly of the character described which permits reversal of the position of the blade on the shank without in any way weakening the connection.

Still another object of the invention is to provide a fastener assembly in which an important component is secured firmly to and preferably made as a part of the blade structure, thus lessening the likelihood of one of the basic connective components being lost or misplaced.

Other and further objects of the invention together with the features of novelty appurtenant thereto will appear in the course of the following description.

In the accompanying drawing, which forms a part of the specification and is to be read in conjunction therewith, and in which like reference numerals indicate like parts in the various views;

FIG. 1 is a side elevational view of a typical chisel plow shank equipped with a blade and fastener assembly embodying the invention;

FIG. 2 is a fragmentary end elevational view taken from the left hand end of FIG. 1;

FIG. 3 is an elevational view of the convex side of the blade disassociated from the shank;

FIG. 4 is an enlarged sectional view taken along line 4—4 of FIG. 2 in the direction of the arrows; and FIG. 5 is an enlarged perspective view of the fastener with the parts in exploded relationship, the shank being broken away for purposes of illustration.

Referring to the drawings, I have chosen for illustration of my invention the shank and blade of a typical chisel plow. There are many different types of plows of this nature on the market but all, generally speaking, do have a frame which carries a plurality of curved shanks such as shank 10 in FIG. 1 depending from the frame. The blade 11 is curved in conformity with the curvature of the shank and is mounted to lie adjacent the front face of the shank. An example of a chisel plow can be found in Graham Patent 2,493,811.

Referring again to FIG. 1, the blade therein shown is what is known as a reversible blade and has the opposite working ends 11a and 11b. The blade is fastened to the shank by the fastener assembly indicated generally at 12 and now to be described.

Referring to FIGS. 3 and 5, it will be seen that secured to the rear face of the blade 11, substantially at its midpoint is the tongue member 13. This tongue member can be welded or otherwise firmly secured to the blade; it also can be made integral therewith.

The tongue member 13 extends through an aperture or opening 10a having substantially the same shape as the cross sectional shape and area of the tongue and of slightly greater area. It will be noted that a substantial portion of the tongue projects well beyond the rear face of the shank. The upper and lower side edges of the projecting portion of the tongue are provided with notches 13a, 13b respectively.

In the assembled condition, the upper notch 13a of the tongue has engaged therein the bight portion 15 of a bifurcated keeper member 16. From FIG. 1, it can be seen that the parallel legs 17 of the keeper member lie on opposite sides of the tongue. The notch 13a is so located that when the bight of the keeper member is engaged therein the undersides of legs 17 engage the rear face of the shank. The legs 17 are given an inside length substantially equal to the distance between the bases of the respective slots 13a, 13b.

Received in the notch 13b opposite from that with which the keeper member is associated is a cross pin 18 which is formed integral with a locking member 19. The locking member 19 is generally outwardly arched in a longitudinal direction and has the leg portions 20 separated by the opening 21. The leg portions 20 of the locking member overlie the parallel legs 17 of the keeper member. At the upper end of the arch member there are the inturned hook-like portions 22 which engage behind the shoulders 23 at the ends of the legs 17 of the keeper member.

It will be observed that the keeper member has extending from its upper end a projection 24 providing two outstanding spaced parallel flanges 25 and, between the flanges, a shoulder 26. Slidably supported in aligned openings in the flanges 25 is a longitudinally slidable bolt element 27 which may be formed of rod stock. The bolt element has a handle 27a formed therein at its upper end. The lower end portion of the bolt element engages the web 28 of the locking member, which is located between the opening 21 therein and the arched cutout 29 which fits over the projection 24 of the keeper member.

It will be noted that the sliding bolt carries a rectangular nut-like element 30 which is secured thereto by a cross pin. A compression spring 31 bears against this nut and against the upper flange, the compression spring serving to bias the sliding bolt toward the extended position for the end thereof shown in FIGS. 1, 2 and 4.

By referring to FIGS. 4 and 5, it will be seen that the nut 30 is mounted on the bolt in an off center position. When it is desired to disengage the end of the bolt from the locking member the operator can pull upwardly on the handle, thus sliding the bolt upwardly against the resistance of the spring 31. When the bolt has been displaced sufficiently that the end of it has been disengaged from the web 28 of locking member 19, the nut 30 has also moved back past the shoulder 26. The bolt can now be turned on its axis to bring the nut into engagement with the shoulder as illustrated in FIG. 5. The shoulder cooperates with the nut to prevent return of the bolt and will do so until the bolt is again turned back to its original position.

In assembling a blade 11 with the shank, the tongue is inserted through the opening 10a as illustrated in FIG. 5. The keeper member 16 is then moved into position with its bight portion in the upper notch 13a. The cross pin 18 of the locking member 19 is then inserted in the lower notch. It is important to note at this point that in inserting the cross pin 18 the locking member should be held so that it extends generally away from the rear face of the shank. With the cross pin in position, the locking member can then be pivoted in a direction to bring its upper end hook portions 22 into engagement behind the shoulders 23 on key member 16. The sliding bolt 27 is then turned to release the nut 30 from the shoulder 26 and the spring assists in moving the bolt into the locking position.

The keeper member and locking member cooperate with one another to prevent either being displaced out of the notches. The forces acting on the blade which would tend to separate it from the shank are all transmitted directly through the major components to the shank. Very little load is carried by the sliding bolt 27, its principal purpose being simply to prevent the locking member from pivoting back out of its assembled position.

To disassemble the blade from the shank requires first that the bolt 27 be pulled upwardly to disengage it from the locking member. At the same time, it will be twisted to the FIG. 5 position to reengage the nut 30 with the shoulder 26. The locking member 19 can then be pivoted counterclockwise, as viewed in FIGS. 1 and 4, about its cross pin 18, so as to disengage the locking member from the keeper member. The locking member is removed from engagement with the tongue and the keeper member is pulled upwardly and out of the tongue also. The blade can now be displaced forwardly away from the shank to withdraw the tongue from the opening. It can either be reversed or replaced with a new blade.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a chisel plow blade assembly, the combination of an upright shank having a lower end portion with front and rear faces,
a blade seated on said front face and extending beyond the lower end of said shank,
a tongue member secured to said blade and extending through a front to rear opening in said lower end portion of said shank, said tongue member having a portion thereof projecting beyond the rear face of said shank, said tongue portion provided with at least one notch in an edge thereof,
a bifurcated keeper member having a bight portion inserted in said notch and parallel legs on opposite sides of the tongue and engaging said rear face on opposite sides of said opening, and
means releasably engaging said tongue member exteriorly of said shank for locking said keeper member against withdrawal of said bight portion from said notch.

2. The combination as in claim 1,
said projecting tongue portion having a second notch in the edge thereof opposite said one edge,
the last named means including a locking member having an element engaged in said second notch and surfaces on either side of said element engaging said rear face,
said locking member further including retention means engaging said keeper member to prevent withdrawal of said bight portion from said one notch.

3. In a chisel plow blade assembly, the combination of
a shank having a lower end portion with front and rear faces,
a blade seated against said front face and extending beyond the end of said shank portion,
a tongue member secured to said blade and extending through a front to rear opening in said lower end portion of said shank, said tongue member having a portion thereof projecting beyond the rear face of said shank,
said tongue portion having notches formed in opposite side edges thereof,
a bifurcated keeper member having a bight portion removably engaged in one of said notches and legs extending on opposite sides of said tongue portion toward the opposite notch, said legs engaging the rear face of said shank portion on opposite sides of the opening therein,
a disengageable locking member having a portion engaged in the said opposite notch and other portions overlying said legs of said keeper member, and
releasable retaining means on said keeper member engaging said locking member and preventing its displacement away from said keeper member.

4. The combination as in claim 3,
said locking member having surfaces engaging the keeper member adjacent said bight portion and preventing displacement of said bight portion from said one notch.

5. The combination as in claim 3,
said retaining means comprising a sliding bolt element carried by said keeper member and normally engaging said locking member.

6. The combination as in claim 5, including
resilient means biasing said bolt element toward the normal position therefor, and
means selectively operable to lock said bolt element in a retracted position in which it is disengaged from said locking member.

7. In a chisel plow blade assembly, the combination of
a generally upright shank having a lower end portion with front and rear faces,
a blade seated against said front face and extending beyond the end of said shank,
a tongue member secured to said blade and extending in a substantially close fit through an opening in said shank, said tongue having a cross section elongated in the longitudinal direction of the shank and of sufficient length in the direction transverse to the faces of the shank to provide a portion projecting well beyond the rear face of the shank, said projecting tongue portion having upper and lower edges, each of which is provided with a notch therein, a bifurcated keeper member having a bight portion inserted in one of said notches with legs extending on either side of the projecting portion of the tongue toward the opposite edge thereof, a locking member having a cross piece removably inserted in the other notch and legs extending on either side of said tongue portion and overlying the legs of said keeper member, the legs on said locking member terminating in hook-like ends which engage the keeper member to prevent sliding withdrawal of the bight portion thereof from the said one notch, and releasable retaining means on said keeper member engaging said locking member and preventing its displacement away from said keeper member.

8. The combination as in claim 7, said locking member having a second cross piece at that end opposite its notch engaged cross piece, said second cross piece engaging the opposite edge of said projecting tongue portion.

References Cited

UNITED STATES PATENTS

| 670,566 | 3/1901 | Shock et al. | 172—751 |
| 3,125,170 | 3/1964 | Rosenvold | 306—16 X |

ABRAHAM G. STONE, *Primary Examiner.*

R. CARTER, R. C. HARRINGTON, *Assistant Examiners.*